(12) United States Patent
Guiney (10) Patent No.: US 10,164,968 B2
(45) Date of Patent: Dec. 25, 2018

(54) SYSTEMS AND METHODS FOR USER AUTHENTICATION

(71) Applicant: MASTERCARD INTERNATIONAL INCORPORATED, Purchase, NY (US)

(72) Inventor: Christopher A. Guiney, Fenton, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 325 days.

(21) Appl. No.: 14/571,958

(22) Filed: Dec. 16, 2014

(65) Prior Publication Data

US 2015/0172276 A1 Jun. 18, 2015

(30) Foreign Application Priority Data

Dec. 17, 2013 (EP) .................................. 13197810

(51) Int. Cl.
*G06F 21/00* (2013.01)
*H04L 29/06* (2006.01)
*G06F 21/36* (2013.01)

(52) U.S. Cl.
CPC ............ *H04L 63/083* (2013.01); *G06F 21/36* (2013.01); *G06F 2221/2133* (2013.01)

(58) Field of Classification Search
CPC .. G06F 21/36; G06F 2221/2133; G06F 21/31; H04L 63/083

(Continued)

(56) References Cited

U.S. PATENT DOCUMENTS 8,752,141 B2 6/2014 Gross
8,776,173 B2 * 7/2014 Paxton .................. G06F 21/316
382/120

(Continued)

FOREIGN PATENT DOCUMENTS

EP 2455883 5/2012
EP 2610775 7/2013
WO 2012/154367 11/2012

OTHER PUBLICATIONS

"Protection Through Multimedia CAPTCHAs", Wesam Al-Sudani et al., MoMM2010 Proceedings; Nov. 8, 2010; pp. 63-68.

(Continued)

*Primary Examiner* — Alexander Lagor
(74) *Attorney, Agent, or Firm* — Harness, Dickey & Pierce, P.L.C.

(57) ABSTRACT

The present disclosure relates to a computer-implemented method for operating a server computer, a user computer and a system to authenticate a user. At a server computer a symbol arrangement and a series of authentication instructions comprising human intelligible text and computer-executable code are generated, the computer-executable code is executed in order to obtain a non-ambiguous instruction series result and the symbol arrangement and the human intelligible text representing the series of instructions are transmitted to a user computer. At the user computer, the symbol arrangement and the human intelligible text are displayed, a user input is received and the user input is transmitted to the user computer. At the server computer, the received user input is compared with the instruction series result and the user is authenticated if the received user input corresponds to the instruction series result.

20 Claims, 6 Drawing Sheets

(58) Field of Classification Search
USPC .................................. 726/2, 7; 713/182, 183
See application file for complete search history.

(56) References Cited

U.S. PATENT DOCUMENTS

| | | | |
|---|---|---|---|
| 2010/0306055 A1* | 12/2010 | Kolb | G06Q 30/0257 705/14.55 |
| 2012/0323700 A1 | 12/2012 | Aleksandrovich et al. | |
| 2013/0007875 A1* | 1/2013 | Jakobsson | G06F 21/36 726/19 |
| 2013/0031640 A1 | 1/2013 | Fisk et al. | |
| 2013/0117813 A1 | 5/2013 | Yudkin et al. | |

OTHER PUBLICATIONS

"A New Scheme for Mobile Based CAPTCHA Service on Cloud", Cloud Computing in Emerging Markets (CCEM), 2012 IEEE International Conference, Oct. 11, 2012; 6 pgs.

* cited by examiner

SYSTEMS AND METHODS FOR USER AUTHENTICATION

CROSS-REFERENCE TO RELATED APPLICATION

This application claims the benefit of and priority to European Patent Application No. 13197810.8 filed Dec. 17, 2013. The entire disclosure of the above application is incorporated herein by reference.

FIELD

The present disclosure relates to a computer-implemented method for operating a server computer, a user computer and a system to authenticate a user. Furthermore, the present disclosure relates to a server computer, a user computer and a system adapted to perform said methods as well as a computer program including instructions for performing said methods.

BACKGROUND

This section provides background information related to the present disclosure which is not necessarily prior art.

To authenticate a user, many websites employ images of distorted text which a user needs to decipher in order to correctly input the text shown in the image, for example the CAPTCHA™ system. Upon entering the correct text, i.e. the text shown in the image, the user is authenticated. These images are supposed to be unintelligible for a computer and thus only a human should be capable of deciphering these texts. Therefore, only humans should be able to be authenticated as users. The ongoing improvement of optical character recognition (OCR) technology however requires these text images to be more and more distorted since continuously improving OCR technologies enable computers to decipher these distorted text images. In order to continue to use this approach, text images need to be more and more distorted to be too difficult to decipher for OCR technologies. Yet, increased distortion not only renders these text images harder to decipher for OCR technologies but also for humans, making this approach to user authentication more and more cumbersome for human users.

SUMMARY

This section provides a general summary of the disclosure, and is not a comprehensive disclosure of its full scope or all of its features.

The present disclosure proposes a different way of authenticating a user which is easier for a human user but more difficult for computers and does not suffer from the issue of improved computer capabilities.

A first embodiment of the present disclosure provides a method for authenticating a user, the method comprising the steps of, at a server computer, generating a symbol arrangement, generating a series of a plurality of authentication instructions with associated human intelligible text representing the series of instructions and computer-executable code for performing the series of instructions on a machine, wherein at least some of the instructions relate to performing actions on the symbol arrangement and wherein applying the series of instructions on the symbol arrangement yields a non-ambiguous instruction series result, executing the computer-executable code for performing the series of instructions on a machine, thereby obtaining the instruction series result; transmitting the symbol arrangement and the human intelligible text representing the series of instructions from the server computer to a user computer; at the user computer displaying the symbol arrangement and the human intelligible text representing the series of instructions on the display of the user computer, receiving a user input; transmitting the result of the user input from the user computer to the server computer; and at the server computer comparing the received result of the user input with the instruction series result and authenticating the user if the received result of the user input corresponds to the instruction series result.

A second embodiment of the disclosure provides a method for authenticating a user, the method comprising the steps performed by a server computer of generating a symbol arrangement, generating a series of a plurality of authentication instructions with associated human intelligible text representing the series of instructions and computer-executable code for performing the series of instructions on a machine, wherein at least some of the instructions relate to performing actions on the symbol arrangement and wherein applying the series of instructions on the symbol arrangement yields a non-ambiguous instruction series result, executing the computer-executable code for performing the series of instructions on a machine, thereby obtaining the instruction series result, transmitting the symbol arrangement and the human intelligible text representing the series of instructions from the server computer to a user computer, receiving from the user computer the result of a user input, comparing the received result of the user input with the instruction series result; and authenticating the user if the received result of the user input corresponds to the instruction series result.

A third embodiment of the disclosure provides a method for authenticating a user, the method comprising the steps performed by a user computer of receiving, from a server computer, a symbol arrangement generated on the server computer and human intelligible text associated with a series of a plurality of authentication instructions generated on the server computer, the text representing the series of instructions, wherein at least some of the instructions relate to performing actions on the symbol arrangement and wherein applying the series of instructions on the symbol arrangement yields a non-ambiguous instruction series result, displaying the symbol arrangement and the human intelligible text representing a series of a plurality of authentication instructions, receiving a user input and transmitting the result of the user input to the server computer.

In exemplary embodiments, a "symbol arrangement" is a set of symbols in which all symbols have a defined position within the symbol arrangement, and defined positional relationship to the other symbols within the symbol arrangement. Furthermore, "actions on the symbol arrangement" in the context of the exemplary embodiments are instructions which refer to positional orientation or movements on the symbol arrangement.

Authenticating a user based on a symbol arrangement and a set of authentication instructions is easy to implement on a computer since the computer generates the authentication instructions and derives the instruction series result from instructions that directly contain the code to be executed to obtain the result. In particular, instructions which refer to positional orientation or movements on the symbol arrangement are easy to perform for a computer and easy to implement. Furthermore, since the code for each instruction is associated with human intelligible text, the generation of the instructions to be displayed on the user computer is also easy to implement. Since the user is provided with plain instructions in natural language, deriving the correct instruction series result and therefore being authenticated is easy for the user. Yet, for a computer which does not know the computer executable code associated with the natural language instruction, deriving the instruction series result is hard since this requires parsing of natural language.

Furthermore, the fact that a series of a plurality of authentication instructions is generated and has to be performed by the user allows to easily increase or decrease the level of security on the one hand and the burden on the user on the other hand, by simply increasing or decreasing the number of the authentication instructions.

According to a fourth embodiment, in any one of the preceding embodiments, generating the symbol arrangement comprises selecting the number of symbols in the symbol arrangement, and the symbol arrangement is generated based on the selected number. This enables the generation of any size of symbol arrangement.

According to a fifth embodiment, in any one of the preceding embodiments, the symbol arrangement is randomly generated. Random generation of the symbol arrangement makes the user authentication more difficult for computers attempting to derive the instruction series result from the natural language instructions since the symbol arrangement differs for each authentication.

According to a sixth embodiment, in the fifth embodiment, the symbol arrangement is generated by receiving a symbol arrangement as a base value, and generating a scrambled version of the base value. Deriving a symbol arrangement by scrambling a base value makes the user authentication sufficiently difficult for a computer but at the same time does not require a lot of processing power to obtain a symbol arrangement.

According to a seventh embodiment, in any one of the preceding embodiments, the symbol arrangement comprises symbols selected from a collection of symbols.

According to an eighth embodiment, in any one of the preceding embodiments, the symbol arrangement is a one-dimensional arrangement, for example an array or string, of symbols. A one-dimensional array or string of symbols is easy to display in the context of user authentication on websites.

According to a ninth embodiment, in any one of the first embodiment to the seventh embodiment, the symbol arrangement is a two-dimensional or three-dimensional arrangement, for example an array, of symbols. Using a two-dimensional or three-dimensional array of symbols makes the user authentication more difficult for a computer to breach. A three-dimensional array can be displayed on a two-dimensional screen with a perspective view.

According to a tenth embodiment, in any one of the preceding embodiments, the symbols are alpha-numeric characters. Usage of alpha-numeric characters enables authentication instructions in natural language which are easy to understand for humans.

According to an eleventh embodiment, in any one of the first embodiment to the ninth embodiment, the symbols are images. Images as symbols are harder to parse for a computer and thus make incorrect authentication of a non-human as a user less likely.

According to a twelfth embodiment, in any one of the preceding embodiments, generating the series of authentication instructions comprises selecting the number of instructions in the series of authentication instructions, and the series of authentication instructions is generated based on the selected number. By appropriately selecting the number of instructions the difficulty of the user authentication can be tailored to the required level of security.

According to a thirteenth embodiment, in any one of the preceding embodiments, the series of authentication instructions is randomly generated. Random generation of the authentication instructions renders the user authentication more difficult for computers since the authentication instruction series differs for every user authentication.

According to a fourteenth embodiment, in the thirteenth embodiment, the instructions are based on predefined types of instructions, and the types of one or more instructions in the series of instructions are randomly selected from a collection of types of instructions. This enables the generation of instructions which change for every user authentication while using little processing power.

According to a fifteenth embodiment, in the thirteenth embodiment or the fourteenth embodiment, the generation of one or more instructions in the series of instructions comprises the selection of one or more random values as instruction parameters. These random instruction parameters are easy to understand for a human but make the instructions more difficult to parse for computers.

According to a sixteenth embodiment, in the fifteenth embodiment, the instruction parameters are direction parameters.

According to a seventeenth embodiment, in the fifteenth embodiment or the sixteenth embodiment, the parameters are integer values.

According to a eighteenth embodiment, in any one of the preceding embodiments, an action may comprise selecting one or more specific symbols in the symbol arrangement.

According to a nineteenth embodiment, in the eighteenth embodiment, the action defines the one or more symbols to be selected by their position within the symbol arrangement.

According to a twentieth embodiment, in any one of the preceding embodiments, an action may comprise going, from a specific one of the symbols in the symbol arrangement, a specific number of places to the left or to the right.

According to a twenty-first embodiment, in any one of the preceding embodiments, an action may comprise going, from a specific one of the symbols in the symbol arrangement, a specific number of places up or down or to the front or to the back.

According to the twenty-second embodiment, in any one of the preceding embodiments, the instruction series result comprises a series of resultant symbols.

According to a twenty-third embodiment, in the twenty-second embodiment, an instruction may comprise adding to the series of resultant symbols one or more symbols from the symbol arrangement which fulfill conditions specified by the instruction. This further reduces the probability of a computer deriving the correct instruction series result since it bases the final result on an intermediate result which itself is already hard to derive for a computer.

According to a twenty-fourth embodiment, in the twenty-second embodiment or the twenty-third embodiment, an instruction may comprise adding to the series of resultant symbols one or more resultant symbols derived from the symbol arrangement in accordance with rules specified by the instruction.

According to a twenty-fifth embodiment, in any of the twenty-second to the twenty-fourth embodiments, the user input comprises sequentially selecting resultant symbols to generate the series of resultant symbols.

According to a twenty-sixth embodiment, in the twenty-fifth embodiment, selection of a resultant symbol by user input is performed by inputting the resultant symbol on a keyboard.

According to a twenty-seventh embodiment, in the twenty-fifth embodiment, selection of a resultant symbol by user input is performed by specifying the resultant symbol within the displayed symbol arrangement with a pointing device or with touch input. This allows for the user authentication to be implemented on devices without keyboards such as mobile phones or tablets.

According to a twenty-eighth embodiment, in the twenty-fifth embodiment, selection of a resultant symbol by user input is performed by specifying the resultant symbol in a list displayed by the user computer. This allows inputting the instruction series result in case it contains symbols which cannot be input using a keyboard.

A twenty-ninth embodiment of the disclosure provides a system comprising a server computer and a user computer, the system being configured to perform the method according to the first embodiment or any one of the fourth to the twenty-eighth embodiments when depending from the first embodiment.

A thirtieth embodiment of the disclosure provides a server computer, the server computer being configured to perform the method according to the second embodiment or any one of the fourth to the twenty-eighth embodiments, when depending from the second embodiment.

A thirty-first embodiment of the disclosure provides a user computer, configured to perform the method according to the third embodiment or any one of the fourth to the twenty-eighth embodiments, when depending from the third embodiment.

A thirty-second embodiment of the disclosure provides a computer program having instructions which when executed cause a computing device or system to perform a method according to any one of the first to the twenty-eighth embodiments.

A thirty-third embodiment of the disclosure provides a computer readable medium having stored thereon a computer program according to the thirty-second embodiment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Embodiments of the present disclosure will now be discussed with reference to the enclosed figures. However, a person skilled in the art will readily appreciate that the detailed description given herein with respect to these figures are for explanatory purposes only, as embodiments of the present disclosure may extend beyond these embodiments.

Figure 1:
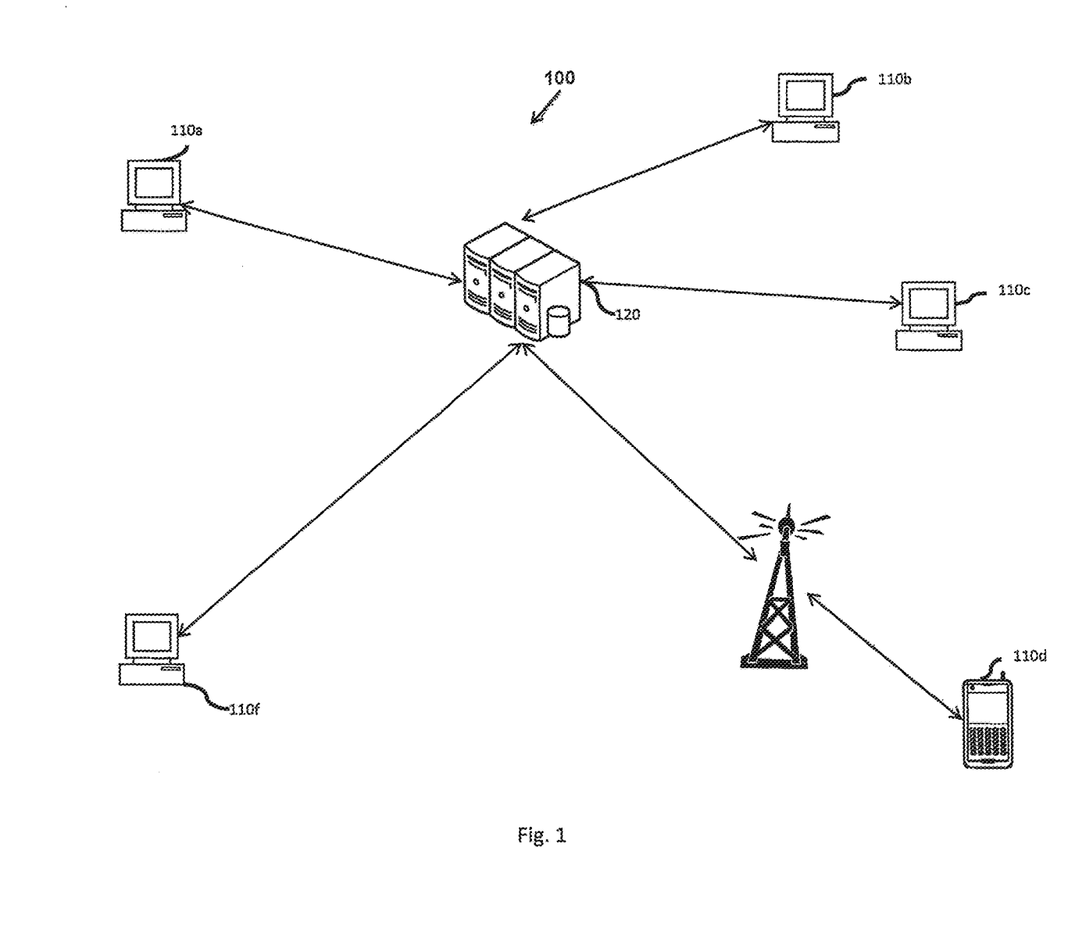
FIG. 1 shows an overall system in accordance with the present disclosure.

FIG. 1 illustrates a schematic overview of the overall system 100 for facilitating the authentication of the user to the server computer. The system 100 comprises a server computer 120 connected to a plurality of user computers 110. A user computer 110 can be, for example, a personal computer, a handheld computer device, or any electronic device which is capable of being connected to the server computer 120. In the exemplary embodiments of the disclosure, the user computer 110 comprises an input and output device, thereby capable of receiving the input from the user and displaying the output received from the server computer 120.

A computer, such as user computer 110 or server computer 120, can be any electronic device configured to store and read data from a computer readable storage medium, said data comprising instructions which can be executed by a general processing unit or any other circuitry of the computer adapted to execute said instructions. A computer readable storage medium can be any electronic device capable of storing computer readable instructions which can subsequently be accessed by a computer. The computer readable storage medium can either be volatile or non-volatile.

As described earlier, the user computer 110 is connected to the server computer 120, thereby facilitating communication between the server computer 120 and the user computer 110. This connection can be in the form of a dedicated connection between the user computer 110 and the server computer 120 or a network connection between the server and a plurality of user computers 110. As a person skilled in the art may understand, the user computers 110 may be connected to the server computer 120 via the Internet or any other computer network, thereby forming a distributed network of a client-server architecture. The server computer 120 may also be implemented by several or distributed server computers 120, e.g. a server cluster, or it may be implemented distributed between various user computers 110, or between one or more server computers 120 and one or more user computers 110.

This interconnection between the user computer 110 and the server computer 120 is either wired or wireless, and the user computers 110 can be connected via the Internet to a large number of user computers 110 in multiple locations. Such an interconnection, however, can also be implemented within a smaller geographical location or by placing restrictions on access to ensure only a limited number of user computers are connected, for example, within an intranet or a VPN network.

Figure 2:
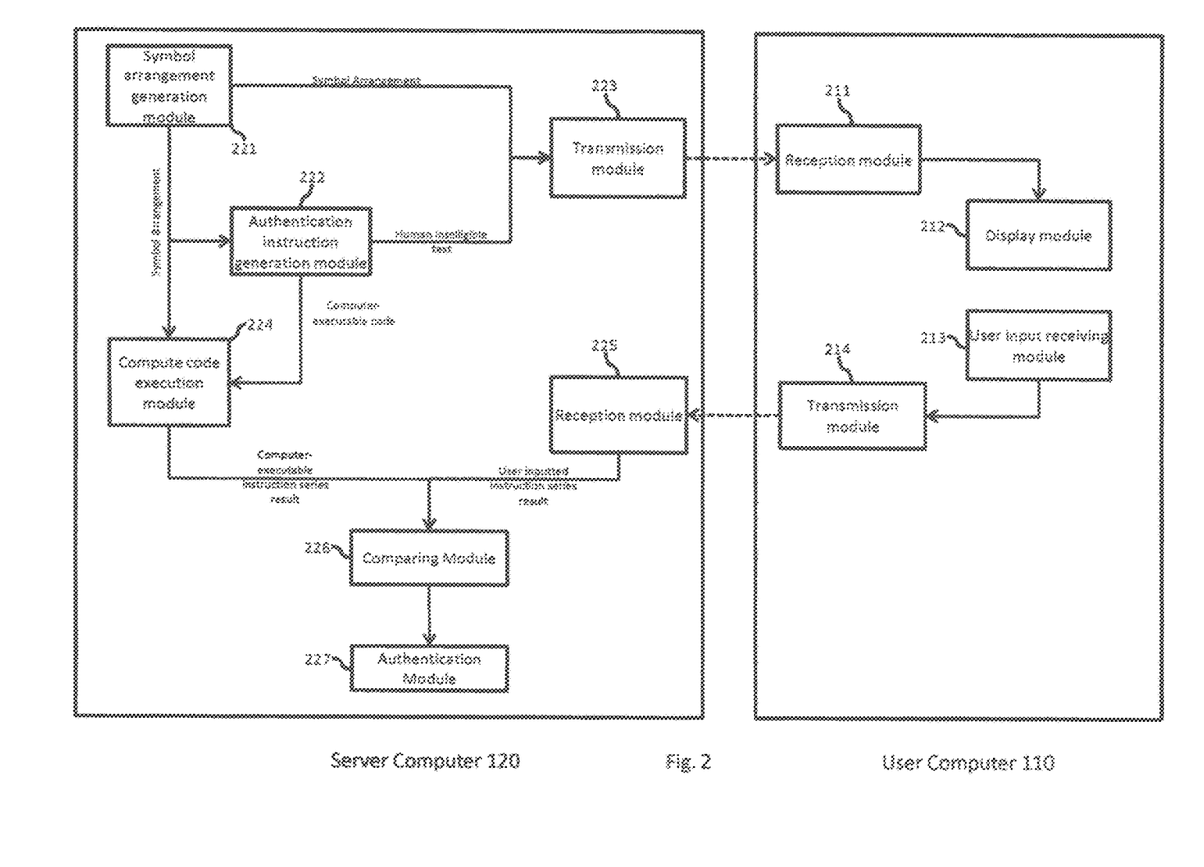
FIG. 2 shows the system with various blocks performing the functions in accordance with the disclosure.

FIG. 2 illustrates the overall functioning of the disclosure in the system 100.

In order to authenticate a user, the present disclosure provides the user with a symbol arrangement and authentication instructions to be applied to the symbol arrangements.

Generating a Symbol Arrangement

In the exemplary embodiment, a symbol arrangement is a set of symbols in which all symbols are defined by their position within the symbol arrangement and by their positional relationship to the other symbols within the symbol arrangement. The symbol arrangement is arranged in such a way that they can be displayed on the user computer 110 in order to facilitate the authentication.

In the exemplary embodiment of the disclosure, the symbol arrangement is generated on the server computer 120 by means of the computer program specifically programmed to perform the generation of symbol arrangements. As a person skilled in the art would understand, the generating of symbol arrangements may also be performed by a standalone programmable device configured to perform the steps required for symbol arrangement generation.

In order to generate the complete symbol arrangement, a numerical value representing a number of symbols in the symbol arrangement may be selected during execution of the symbol arrangement generation module 221. In one embodiment of the disclosure, the selection of the numerical value of the number of symbols is either predetermined or programmed to the symbol arrangement generation module 221. In another embodiment of the disclosure the number of symbols is a random number generated by symbol arrangement generation module 221.

Then, the symbol arrangement generation module 221 generates the symbol arrangement based on the number of symbols. In one embodiment of the disclosure, the symbol arrangement is randomly generated by symbol arrangement generation module 221. In another embodiment of the disclosure, the symbol arrangement generation module 221 is provided with a predetermined base value which is then scrambled to generate a scrambled version of the provided base value which is used as the symbol arrangement. The predetermined base value is an arrangement of selected symbols which are used to generate the symbol arrangement. In general, the symbol arrangement is generated by selecting symbols and arranging them from a predetermined collection of symbols provided to the symbol arrangement generation module 221.

As a skilled person may understand, any of the above embodiments may be used to either select the number of symbols or generate a symbol arrangement, either independently or simultaneously in any combination by the symbol arrangement generation module 221.

In one embodiment, the symbol arrangement which is generated by the symbol arrangement generation module 221 is a one-dimensional array (or string) of symbols of alphanumerical characters or images or a combination of both. In another embodiment of the disclosure, the symbol arrangement generated by the symbol arrangement generation module 221 is a two-dimensional array of symbols of alphanumerical characters or images or a combination of both.

The generated symbol arrangement is subsequently sent to the computer code execution module 224 which determines the instruction series result and to the transmission module 223 which transmits the symbol arrangement to the user computer 110 for display.

Generating Authentication Instructions

As described earlier, in order to authenticate a user, the present disclosure provides the user with a symbol arrangement and a series of authentication instructions to be applied to the symbol arrangements before the user is authenticated.

The series of a plurality of authentication instructions comprises a human intelligible text which represents the series of instructions and a computer executable code for performing the series of instructions on a machine.

The human intelligible text is generated and displayed in natural language such that it is readable by a human. As a person skilled in the art may understand, the natural language describes any language which is either spoken, read or written by a human. Furthermore, the human intelligible text is not necessarily a written text but can also be a sound representing the text in a natural language.

The computer executable code in a machine readable format for performing the series of instructions on a machine corresponding to the authentication instructions is also generated simultaneously to the human readable text. This machine readable code is generated such that, on executing the computer readable code, the resultant obtained is the same as that obtained from the correct execution of the human readable instruction.

In the exemplary embodiment of the disclosure, the series of authentication instructions are generated on the server computer 120 by means of the computer program specifically programmed to perform the generation of the series of authentication instructions. As a person skilled in the art would understand, the generating a of series of authentication instructions may also be performed by a standalone programmable device configured to perform the steps required for symbol arrangement generation such as the authentication instruction generation module 222.

The number of authentication instructions which are generated by authentication instruction generation module 222 is based on selecting a number of instructions (i.e. based on a selected number).

First, a numerical value representing the number of authentication instructions is selected. In one embodiment of the disclosure, the selection of the numerical value representing the number of authentication instructions is predetermined and programmed to the authentication instruction generation module 222. In another embodiment of the disclosure the numerical value representing the number of authentication instructions is a random number generated by authentication instruction generation module 222.

Then, the authentication instruction generation module 222 generates the series of authentication instructions based on the numerical value representing the number of authentication instructions. These authentication instructions generated by the authentication instruction generation module 222 at least partially contain instructions which refer to positional orientation or movements. In one embodiment of the disclosure, the authentication instruction is randomly generated by authentication instruction generation module 222. In another embodiment of the disclosure, the series of authentication instructions are selected from a predetermined set of instructions. In yet another embodiment of the disclosure, the authentication instructions which are randomly generated are based on predefined types of instructions which are randomly selected from a collection of types of instructions.

The authentication instruction generation module 222 makes use of instruction parameters to generate an authentication instruction. The instruction parameters are the variable parameters which can be changed when the authentication instructions are generated.

The instruction parameter is a direction parameter which includes additional parameters such as initial position, number of places, moving direction and also the case parameter which can be applied to the generated symbol arrangement obtained from the symbol arrangement generation module 221.

An authentication instruction format is for example: Start at a position <initial position parameter> and move <number of places parameter> spaces to the <going direction parameter>, entering that symbol in <case parameter>.

In the above example authentication instruction format, the initial position parameter is an integer value which instructs which symbol in the symbol arrangement should be considered as the initial position symbol. The number of places parameter instructs how many places must be gone from the initial position. Both the above parameters are represented as integer values. Going direction parameter instructs the direction of going a specific number of places from the initial position symbol. This parameter is represented as either left or right direction in case of a one-dimensional symbol arrangement, and either left or right or up or down in case of a two-dimensional symbol arrangement. Finally, the case parameter instructs whether the symbol should be entered in the same case of a case different from the one provided in the symbol arrangement such as capitalized symbol or un-capitalized symbol.

Each authentication instruction when performed on the generated symbol arrangement leads to a resultant symbol which fulfills the conditions or rules specified by the instruction. The combination of each resultant symbol provides an instruction series result.

Computer Code Execution Module

The computer code execution module 224 receives the computer code which is generated by the authentication instruction generation module 222 and the symbol arrangement generated by the symbol arrangement generation module 221.

The computer code execution module 224 then executes the computer executable code for performing the series of instruction on a machine on the generated symbol. Each of the authentication instructions in the series of authentication instructions when executed and performed on the generated symbol arrangement may result in a resultant symbol. The combination of these resultant symbols provides a non-ambiguous instruction series result generated by computer code execution module 224.

Transmission Module of Server Computer

The transmission module 223 provided in the server computer 120 transmits the generated symbol arrangement from the symbol arrangement generation module 221 and the human intelligible text representing the series of instructions generated from the authentication instruction generation module 222.

The transmission module 223 supports any wired or wireless communication protocol for data transmission between the server computer 120 and the user computer 110 as described earlier.

User Computer

The reception module 211 of user computer 110 receives the generated symbol arrangement and the human intelligible text representing the series of instructions from the server computer 120.

This generated symbol arrangement and the human intelligible text representing the series of instructions is displayed on the user computer 110 by the display module 212. The user computer 110 is provided with an output device such as a monitor in order to display the above information to the user.

The user computer 110 is then provided with an option to input the resultant symbol corresponding to the human intelligible text of an authentication instruction (e.g., via user input receiving module 213). The option may be a text input box to enable the user to input the resultant symbol on a keyboard or, in case of a touchscreen device, pointing or touching means. Alternatively, the instruction series result may also be selected from a collection of resultant values provided as a selection option to the user. The user may then select the correct resultant from the list provided. It also comprises the user computer 110 to sequentially select resultant symbols to generate the series of resultant symbols. As a person skilled in the art might understand, in case of providing alternative resultant options, these alternative options are also transmitted from the server computer 120 for display on the user computer 110.

The user inputted instruction series result is then transmitted by the transmission module 214 of the user computer 110 back to the server computer 120 by the transmission module 214.

Comparing Module

The user inputted instruction series result as transmitted from the user computer 110 is received by the reception module 225 on the server computer 120. Since the human intelligible text and the computer executable code relate to the same authentication instructions, the instruction series result as inputted by the user and instruction series result obtained by executing the computer executable code should be the same. The comparing module 226 on the server computer 120 compares the user inputted instruction series result with the instruction series result generated by computer code execution module 224. If they correspond to each other, which confirms that the user is valid, the user computer 110 is authenticated (e.g., by authentication module 227).

Method Performed in the Server Computer

Figure 3:
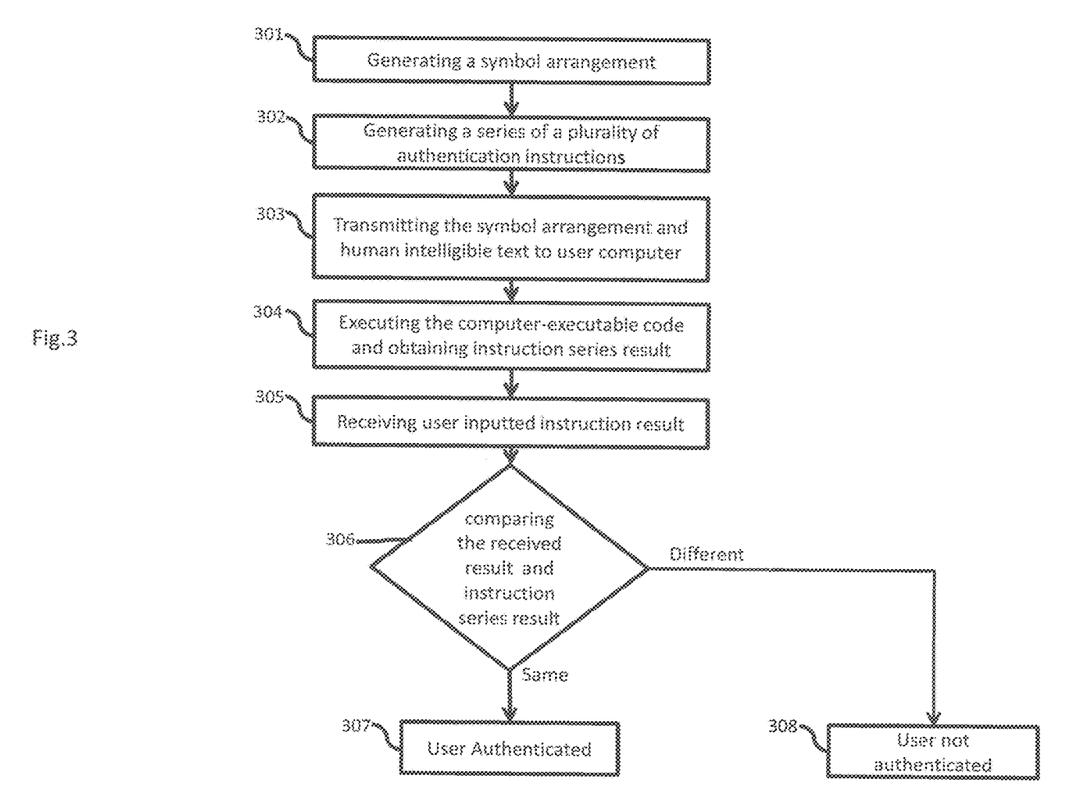
FIG. 3 shows a flow diagram of the method steps performed by the server computer.

FIG. 3 shows a flow diagram of the method steps performed by the server computer.

In step 301, the server computer generates a symbol arrangement as described with regard to the symbol arrangement module 221. In step 302, the server computer generates a plurality of authentication instructions comprising human intelligible text representing the instructions and the corresponding computer executable code for performing the series of instructions on the generated symbol arrangement on the machine. The above step is performed by the authentication instruction generation module 222 as explained earlier.

The instruction comprises further instructions for performing actions which refer to positional orientation or movements on the generated symbol arrangement.

In step 303, the server computer 120 transmits the generated symbol arrangement and human intelligible text to user computer 110.

In step 304, the server computer 120 performs the authentication instructions on the generated symbol arrangement which is the computer executable code on the machine to yield a non-ambiguous instruction series result. As will be understood by a skilled person, this step could also be performed at any later stage before comparing the input in step 306 instead.

The server computer 120 then receives the user input relating to the instruction result from the user computer 110 in step 305.

In step 306, the received user input relating to the instruction result is compared with the instruction series result obtained in step 304. In case that both the results are the same the user is authenticated in step 307, otherwise the user is authenticated to proceed further in step 308.

Furthermore, as can be understood by a person skilled in the art, all the above steps may be performed in the same server or different server computers, either in concurrence with each other or immediately one after the other and at various times or be interrupted by an undefined time interval.

Method Performed in the User Computer

Figure 4:
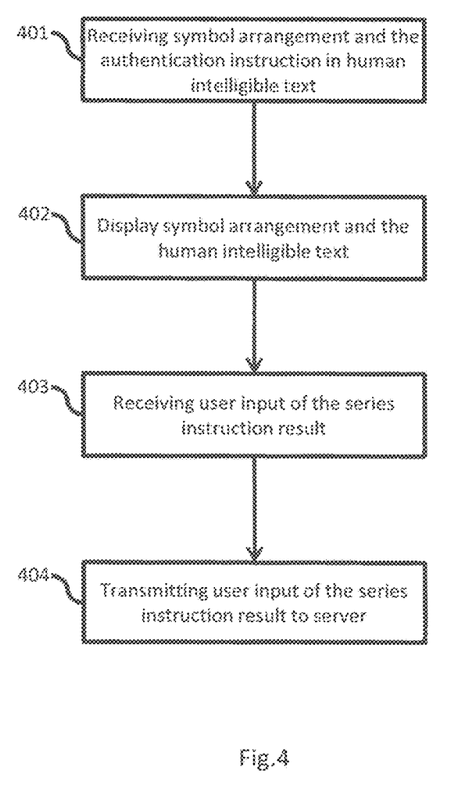
FIG. 4 shows a flow diagram of the method steps performed by the user computer.

FIG. 4 shows a flow diagram of the method steps performed by the user computer 110.

The user computer 110 receives the symbol arrangement and the authentication instruction in human intelligible text in step 401. This information is then displayed on the display device of the user computer in step 402.

The user is then instructed to input the instruction result by applying the authentication instruction series on the symbol arrangement provided. This input is received by the user computer 110 in step 403. Finally, the instruction result as inputted by the user is transmitted to the server computer 120 and submitted by the user in step 404. As a person skilled in the art may understand, inputting the instruction result may automatically lead to submitting and thereby transmitting result to the server computer 120. Alternatively, these steps may be performed individually as separate actions.

Example Embodiment According to the Disclosure: Alpha-Numeric String

Figure 5A:
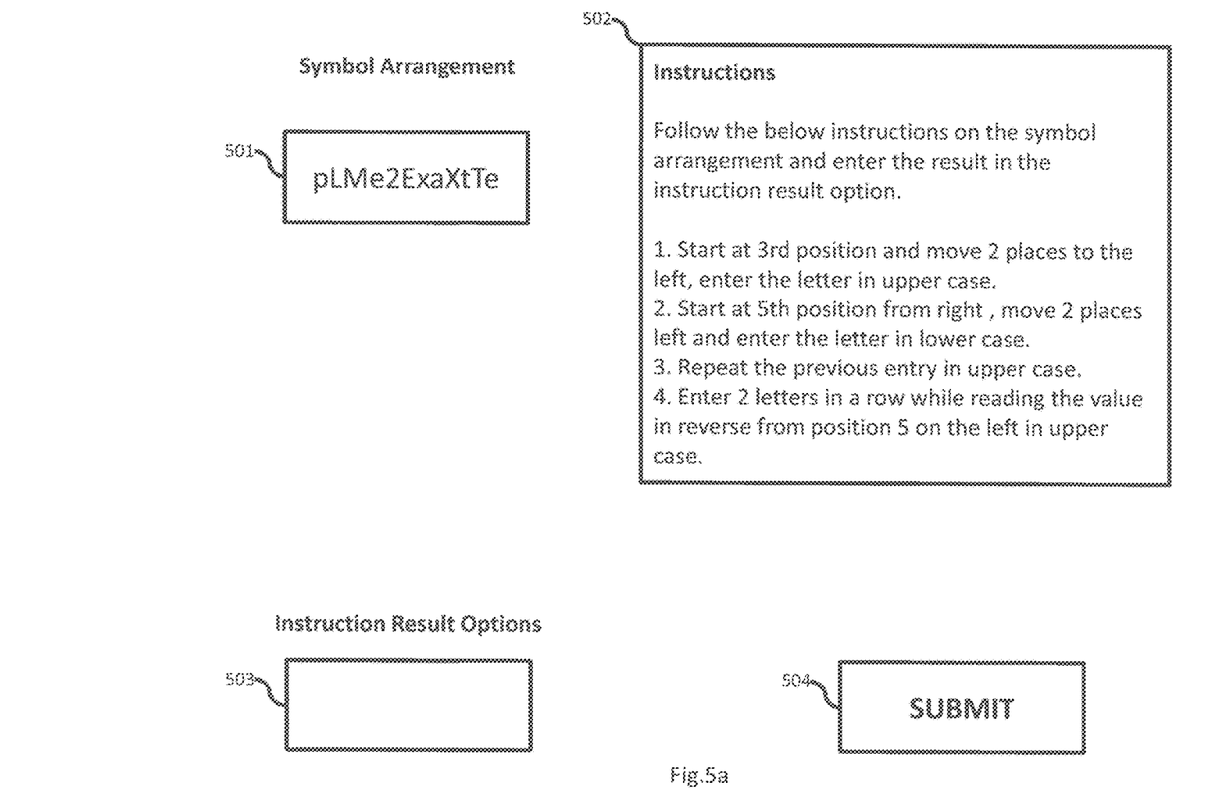
FIG. 5a shows an example implementation of the present disclosure by use of a one-dimensional symbol arrangement in the form of alphanumerical characters.

FIG. 5a illustrates an example implementation of the present disclosure by use of a symbol arrangement in the form of alphanumerical characters on an example user screen. In the current example, the symbol arrangement generation module 221 is provided with a predetermined base value, which is selected as "ExaMpLe2TeXt". This base value is then scrambled to generate a scrambled version of the provided base value which is used as the symbol arrangement. As seen in text box 501, the scrambled version of the base value is generated and displayed as "pLMe2ExaXtTe". As described earlier, a person skilled in the art will understand that any other method for providing a symbol arrangement can be used.

The authentication instruction generation module 222 generates the series of authentication instructions based on the numerical value representing the number of authentication instructions. In the present example, a numerical value of four is selected, thereby generating a series with four authentication instructions as seen in textbox 502.

Each authentication instruction generation module 222 makes use of instruction parameters to generate an authentication instruction. In the example provided in FIG. 5a, the first human intelligible authentication instruction reads as below.

1. Start at $3^{rd}$ position and move 2 places to the left, enter the letter in upper cases In the above provided example authentication instruction, the initial position parameter is an integer value of 3, the number of places parameter is set at 2, the going direction parameter is left, and the case parameter is upper case. Places here mean symbol positions, i.e. in the instruction above, "2 places to the left" means moving two symbol positions to the left.

An example computer algorithm for the above authentication instruction would have the following steps:
1: start
2: set initial position as third symbol
3: go two place to the left from the initial position
4: convert the symbol to uppercase, set result as instruction result
5: output instruction result In order to obtain the instruction result, the user considers the human intelligible text as provided above. Firstly, the user determines the initial position based on the instruction provided, in this case the initial position parameter 3, thereby instructing the user that the third symbol is to be considered as the initial position, i.e. in this example symbol M. Next, the number of places parameter 2 and the going direction parameter left instruct the user to move two places to the left from the initial position. In the present example this position is symbol "p". Finally, the case parameter of uppercase instructs the user to enter the symbol in uppercase. Therefore, the resultant symbol is "P".

Similarly, other resultant symbols are obtained thereby resulting in an instruction series result.

An authentication instruction does not necessarily contain all the direction parameters. The authentication instruction may in some cases be merely an instruction or a rule which when followed provides an authentication result symbol. For example, the third instruction in the present example requires entering the previously obtained result symbol in uppercase.

The instruction series result of the example embodiment is peEEX.

Example Embodiment According to the Disclosure: Images as Symbols

Figure 5B:
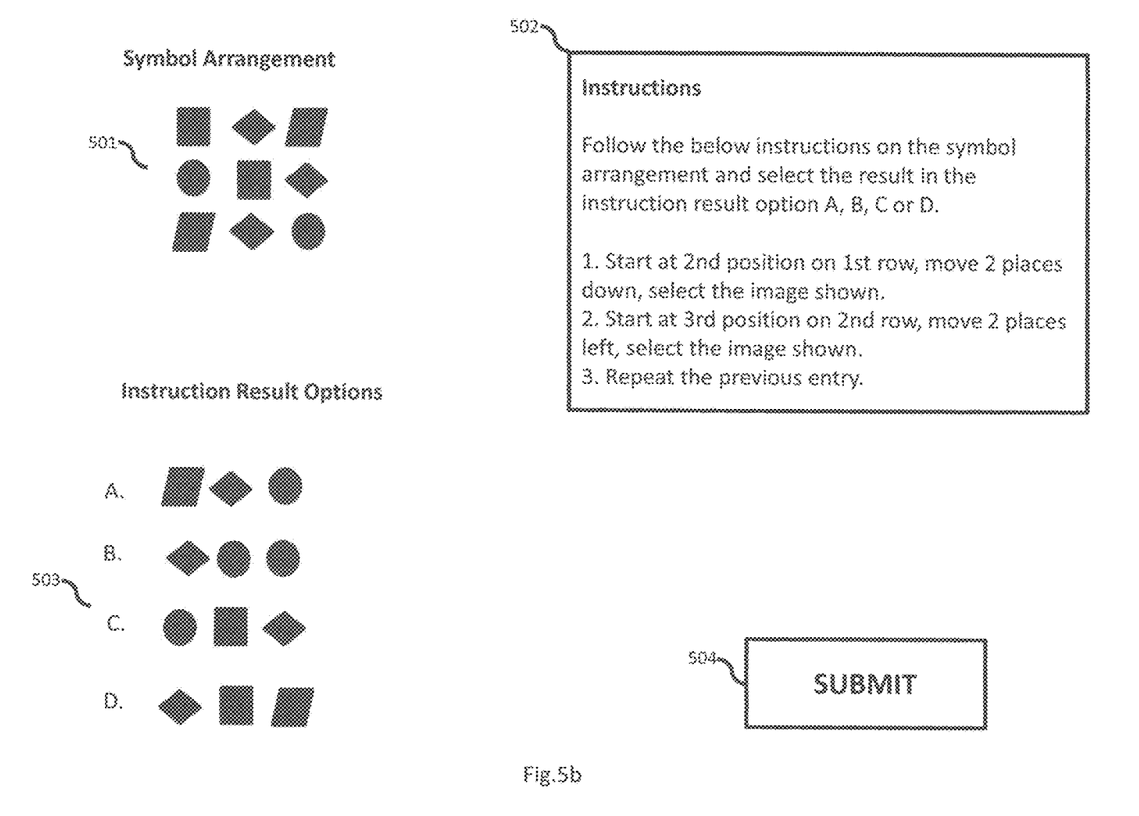
FIG. 5b shows another example implementation of the present disclosure by use of a two-dimensional symbol arrangement in the form of images.

FIG. 5b shows another example implementation of the present disclosure by use of a two-dimensional symbol arrangement in form of images. In the current example, the symbol arrangement generation module 221 is provided with different shapes, which are then used to generate the symbol arrangement in form of a 3×3 matrix.

The authentication instruction generation module 222 generates the series of authentication instructions based on the numerical value representing the number of authentication instructions, which, in the present example, is three.

Similar to the previous example, the authentication instruction generation module 222 makes use of instruction parameters to generate an authentication instruction. However unlike the previous example, the direction parameter also contains an up or down parameter. In the example provided in FIG. 5b, the first human intelligible authentication instruction reads as below:

1. Start at $2^{nd}$ position on 1st row, move 2 symbols down, select the image shown An example computer algorithm for the above authentication instruction would have the following steps:
1: start
2: set initial position as second symbol on first row
3: go two places down from the initial position
4: set result as instruction result
5: output instruction result According to the first instruction, the resultant symbol is a rhombus shape image. Similarly, the resultant symbol of the other instructions in the series of instruction obtains a result comprising a rhombus followed by a circle and another circle. Unlike the previous example, the present illustration provides four options from which the user selects the right option relating to the instruction series. Therefore, in the example, option B is the right instruction series result which may be selected by the user. As a person skilled in the art might understand, each option is selectable either by an option box 503 or may be provided as a button instead of providing a separate submit button 504.

It should be appreciated that the functions described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

Further, it should be appreciated that the present disclosure is not limited to the embodiment(s) described herein but can be amended or modified without departing from the scope of the present disclosure. It will be appreciated that the methods described are by way of example only and various modifications of the disclosed methods may be made. For example, the order in which steps of the methods are performed may be altered or individual steps may be omitted.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for authenticating a user, the method comprising:
    at a server computer:
        generating a symbol arrangement;
        generating a series of authentication instructions with associated human intelligible text representing the series of instructions and computer-executable code for performing the series of instructions on a machine, wherein at least some of the instructions relate to performing actions on the symbol arrangement and wherein applying the series of instructions on the symbol arrangement yields a non-ambiguous instruction series result;
        executing the computer-executable code for performing the series of instructions on a machine, thereby obtaining the instruction series result; and
        transmitting the symbol arrangement and the human intelligible text representing the series of instructions from the server computer to a user computer;
    at the user computer:
        displaying the symbol arrangement and the human intelligible text representing the series of instructions on a display of the user computer;
        receiving a user input; and
        transmitting the result of the user input from the user computer to the server computer;
    at the server computer:
        comparing the received result of the user input with the instruction series result; and
        authenticating the user if the received result of the user input corresponds to the instruction series result.

2. The method according to claim 1, wherein generating the symbol arrangement comprises selecting the number of symbols in the symbol arrangement, and the symbol arrangement is generated based on the selected number.

3. The method according to claim 1, wherein the symbol arrangement is selected from the group consisting of a one-dimensional arrangement, a two-dimensional arrangement, and a three-dimensional arrangement.

4. The method according to claim 1, wherein generating the series of authentication instructions comprises selecting a number of instructions in the series of authentication instructions, and the series of authentication instructions is generated based on the selected number.

5. The method according to claim 4, wherein generating the series of instructions comprises selecting one or more random values as instruction parameters.

6. The method according to claim 1, wherein the series of instructions indicate one or more action, each action including one of selecting one or more specific symbols in the symbol arrangement, going, from a specific one of the symbols in the symbol arrangement, a specific number of places to the left or to the right or going, from a specific one of the symbols in the symbol arrangement, a specific number of places up or down or to the front or to the back.

7. The method according to claim 1, wherein the instruction series result comprises a series of resultant symbols; and wherein the resultant symbols include one or more alphanumeric characters.

8. The method according to claim 7, wherein an instruction comprises one or more of adding to the series of resultant symbols one or more symbols from the symbol arrangement which fulfill conditions specified by the instruction, and adding to the series of resultant symbols one or more resultant symbols derived from the symbol arrangement in accordance with rules specified by the instruction.

9. A method for authenticating a user, the method comprising:

generating, by a server computer, a symbol arrangement, the symbol arrangement including multiple symbols, each symbol being an alpha-numeric character;

generating, by the server computer, a series of authentication instructions with associated human intelligible text representing the series of authentication instructions and computer-executable code for performing the series of authentication instructions on a machine, wherein applying the series of authentication instructions to the symbol arrangement yields a non-ambiguous instruction series result;

executing, by the server computer, the computer-executable code for performing the series of instructions on a machine, thereby obtaining the instruction series result;

transmitting, by the server computer, the symbol arrangement and the human intelligible text representing the series of instructions to a user computer;

receiving, by the server computer, from the user computer a result of a user input;

comparing, by the server computer, the received result of the user input with the instruction series result; and authenticating, by the server computer, the user when the received result of the user input corresponds to the instruction series result.

10. The method according to claim 9, wherein generating the symbol arrangement comprises selecting a number of symbols in the symbol arrangement, and wherein the symbol arrangement is generated based on the selected number.

11. The method according to claim 9, wherein the symbol arrangement is selected from the group consisting of a one-dimensional arrangement, a two-dimensional arrangement, and a three-dimensional arrangement.

12. The method according to claim 9, wherein generating the series of authentication instructions comprises selecting a number of authentication instructions in the series of authentication instructions, and wherein the series of authentication instructions is generated based on the selected number.

13. The method according to claim 9, wherein the series of authentication instructions includes multiple actions; and
wherein the multiple actions include one or more of
going, from a specific one of the symbols in the symbol arrangement, a specific number of places to the left or to the right and/or going, from a specific one of the symbols in the symbol arrangement, a specific number of places up or down or to the front or to the back.

14. The method according to claim 9, wherein the instruction series result comprises a series of resultant symbols, each resultant symbol being an alpha-numeric character.

15. A method for authenticating a user, the method comprising:

receiving from a server computer, a symbol arrangement and human intelligible text associated with a series of authentication instructions, the text representing the series of instructions, wherein at least some of the instructions relate to performing actions relative to the symbol arrangement and wherein applying the series of instructions on the symbol arrangement yields a non-ambiguous instruction series result;

displaying, at a user computer, the symbol arrangement and the human intelligible text representing the series of authentication instructions;

receiving a user input indicative of a result, the result including multiple symbols from the symbol arrangement; and transmitting the result of the user input to the server computer, whereby the server computer is able to authenticate the user based on the result.

16. The method according to claim 15, wherein the symbol arrangement is selected from the group consisting of a one-dimensional arrangement, a two-dimensional arrangement, and a three-dimensional arrangement.

17. The method of claim 15, wherein the multiple symbols include one or more shapes.

18. The method of claim 15, wherein the multiple symbols include alpha-numeric characters.

19. The method of claim 15, wherein receiving the user input includes receiving an entry of one or more symbols and/or a single selection of multiple symbols.

20. The method of claim 15, wherein the series of authentication instructions is indicative of at least one of the following actions:
go, from a specific one of the symbols in the symbol arrangement, a specific number of places to the left;
go, from a specific one of the symbols in the symbol arrangement, a specific number of places to the right; and/or
go, from a specific one of the symbols in the symbol arrangement, a specific number of places up or down.

* * * * *